(12) United States Patent
Delshadpour et al.

(10) Patent No.: US 11,322,975 B1
(45) Date of Patent: May 3, 2022

(54) POWER SOURCE SWITCHING

(71) Applicant: NXP B.V., Eindhoven (NL)

(72) Inventors: Siamak Delshadpour, Phoenix, AZ (US); Madan Mohan Reddy Vemula, Tempe, AZ (US); Steven Daniel, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/067,378

(22) Filed: Oct. 9, 2020

(51) Int. Cl.
*H02J 9/06* (2006.01)
*H02M 3/335* (2006.01)

(52) U.S. Cl.
CPC ......... *H02J 9/068* (2020.01); *H02M 3/33507* (2013.01)

(58) Field of Classification Search
None
See application file for complete search history.

(56) References Cited

U.S. PATENT DOCUMENTS

| | | | | |
|---|---|---|---|---|
| 4,812,672 A * | 3/1989 | Cowan | ................... | H02J 9/061 307/64 |
| 5,886,561 A * | 3/1999 | Eitan | ..................... | H02J 9/061 327/408 |
| 6,522,190 B1 * | 2/2003 | Malik | ................... | H02J 1/108 327/408 |
| 9,568,926 B2 | 2/2017 | Su et al. | | |
| 9,570,941 B2 | 2/2017 | Vemula | | |

* cited by examiner

*Primary Examiner* — Jeffery S Zweizig

(57) ABSTRACT

A power source switching circuit is disclosed. The power source switching circuit includes a voltage regulator, a first transistor and a second transistor. The first transistor is coupled with a first voltage source and the second transistor is coupled with a second voltage source. The voltage regulator includes a resistor, one or more diodes coupled together in series and a capacitor. Terminals of the capacitor are coupled between a gate and a source of the first transistor through a first switch and a second switch respectively. The capacitor is configured to hold charge to switch the first transistor on. A value of the capacitor is smaller than a gate to source capacitance of the first transistor.

15 Claims, 4 Drawing Sheets

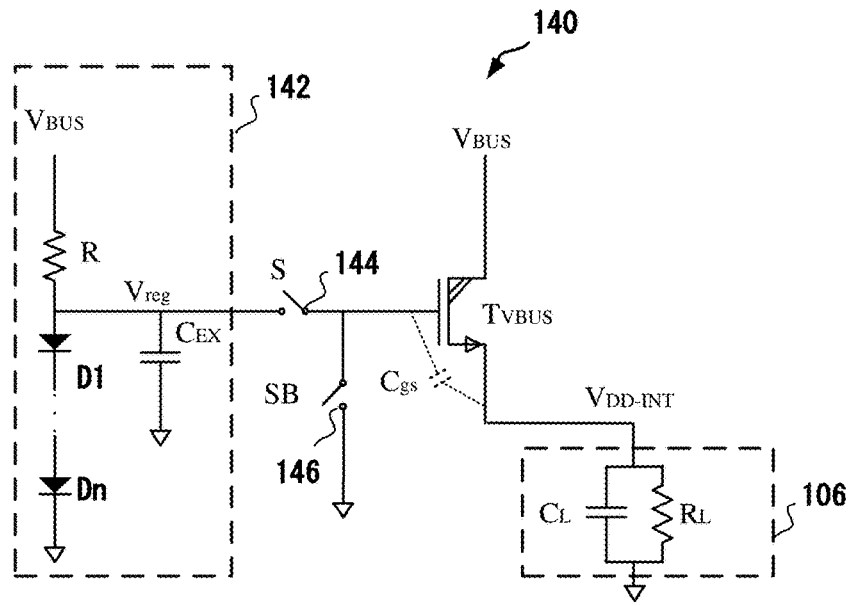
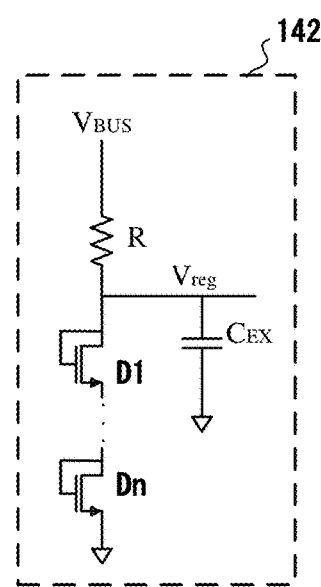
Fig. 2A    Fig. 2B
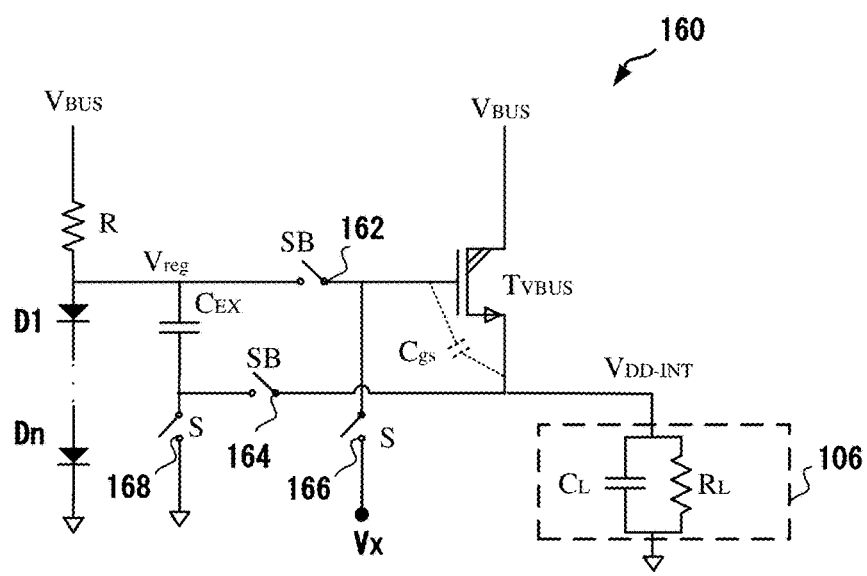
Fig. 3

POWER SOURCE SWITCHING

BACKGROUND

Many circuits and devices are operable using two or more different power sources. These sources may, for example, be provided on different supply rails and may be provided internally, externally or both. For instance, many devices such as portable computers have an internal battery and are also operable via an external power supply.

Various circuits have a power supply rail that provides power derived from two or more external power supplies. These external power supplies may be connected and disconnected or otherwise turned on and off, which can present challenges to providing power on an internal power supply rail. For example, generating an internal power supply without any voltage dips when respective external supplies turn on and off can be challenging. In addition, back current and voltage dips can occur on an internal power supply when an external power supply is disconnected or goes to 0V. If the internal power supply voltage undergoes a large voltage drop, this may cause the circuit being powered to go through the power cycle, which can adversely affect the operation of the circuit. For example, when both a battery and an AC/DC adaptor are connected to a laptop computer, removing the AC/DC adaptor or battery may undesirably cause the laptop computer to reboot.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a power source switching circuit is disclosed. The power source switching circuit includes a voltage regulator, a first transistor and a second transistor. The first transistor is coupled with a first voltage source and the second transistor is coupled with a second voltage source. The voltage regulator includes a resistor, one or more diodes coupled together in series and a capacitor. Terminals of the capacitor are coupled between a gate and a source of the first transistor through a first switch and a second switch respectively. The capacitor is configured to hold charge to switch the first transistor on. A value of the capacitor is smaller than a gate to source capacitance of the first transistor. In some examples, the value of the capacitor is configured to keep a voltage drop at an input of a load within a predefined threshold during a transition from the first voltage source to the second voltage source.

In some examples, the capacitor is coupled with a ground through a first resistor and a third switch and the gate of the first transistor is coupled with the ground through a second resistor and a fourth switch. The third switch and the fourth switch are configured to be operated by a switching pulse. The first switch and the second switch are configured to be operated by an inverse of the switching pulse.

The first switch and the second switch are configured to be closed upon a detection of an availability of the first power source and an unavailability of the second power source. The third switch and the fourth switch are closed upon a detection of an availability of the second power source and an unavailability of the first power source. The a number of the one of more diodes depends on the voltage needed to turn on the first transistor. A filter capacitor coupled to the one of more diodes in parallel to filter noise on an output of the voltage regulator may also be included. The filter capacitor is smaller in value than the capacitor.

In some other examples, a first switch coupled between gate of the first transistor and the voltage regulator may be included. A second switch coupled between the second capacitor and ground may also be included. A fifth switch coupled with a gate of the second transistor may be included too. The third switch and the fourth switch are configured to be operated by a first switching pulse and the fifth switch is configured to be operated by a second switching pulse, wherein the first switch pulse has a narrower pulse width than the second switching pulse.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 2A depicts an improved switching circuit for the first power source side transistor in accordance with one or more embodiments of the present disclosure;

FIG. 2B shows a transistor based implementation of the diodes in FIG. 2A in accordance with one or more embodiments of the present disclosure;

FIG. 3 shows a schematic of a circuit for switching between the power sources in accordance with one or more embodiments of the present disclosure;

Figure 1A:
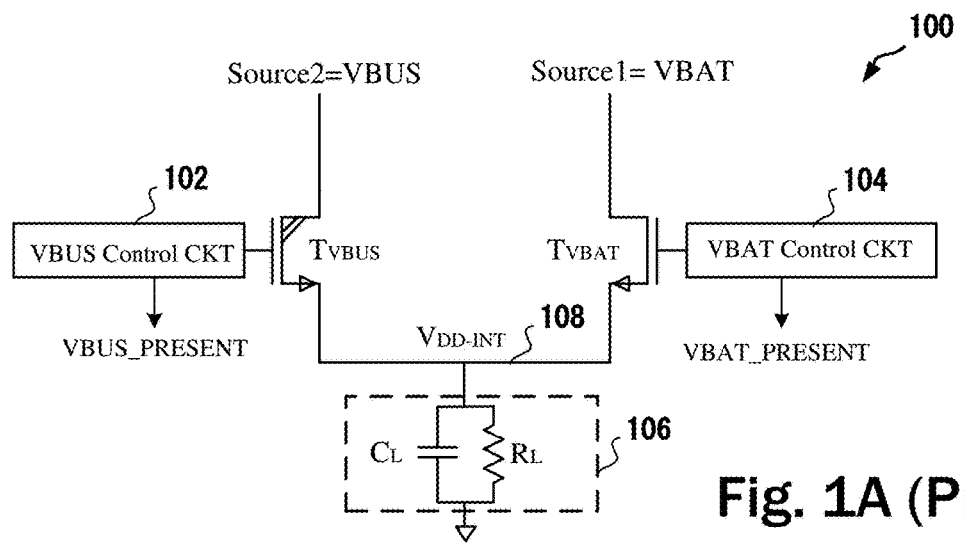
FIG. 1A depicts a conventional power source switching circuit.

Note that figures are not drawn to scale. Not all components in the chip are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 2:
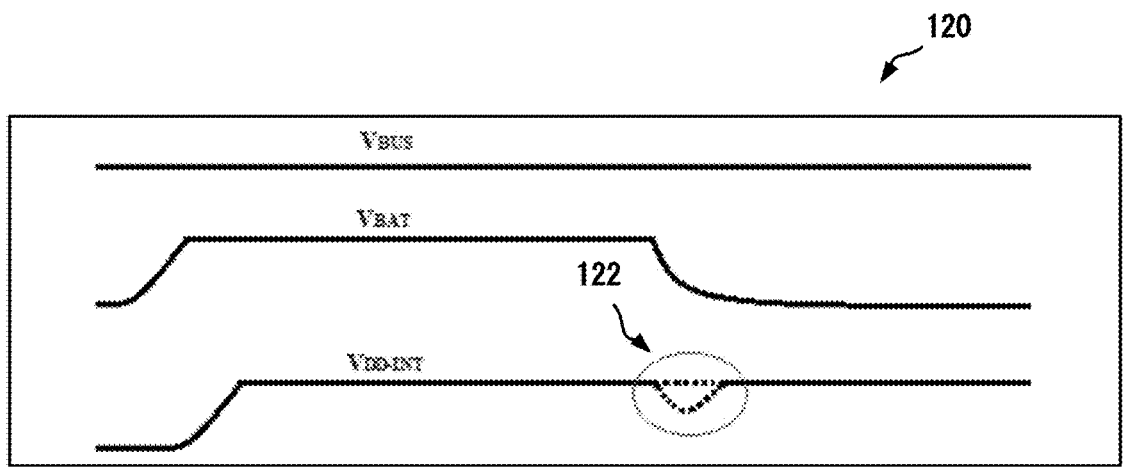
FIG. 2 depicts power signal status during the switching of the power sources.

FIG. 1A shows a conventional power source switching circuit 100. The circuit 100 includes ports for power source 1 ($V_{BAT}$) and power source 2 ($V_{BUS}$) is coupled with a switching transistor $T_{VBUS}$. The transistor $T_{VBUS}$ is controlled by a $V_{BUS}$ control circuit 102 and the transistor T is controlled by a control circuit 104. A load 106 is coupled with both transistors $T_{VBUS}$ and T. The load 106 is coupled with an internal power rail 108 that provide a voltage $V_{DD\text{-}INT}$ to the load 106. The load may include a resistive load $R_L$ and a capacitance $C_L$. The capacitance $C_L$ may be a physical capacitor or a parasitic capacitor or a combination thereof. $V_{BUS\_PRESENT}$ signal causes the transistor $T_{VBAT}$ to switch off and $V_{BAT\_PRESENT}$ signal causes the transistor $T_{VBUS}$ to switch off. These may happen through some simple logics which use both $V_{BAT\_PRESENT}$ and $V_{BUS\_PRESENT}$ signals During the turning on one of these transistors and turning off of the other transistor may not occur simultaneously. As shown in FIG. 2 that shows the status of power signals 120, there may be a period of time 122 in which one transistor has been switched off but the other transistor has not turned on fully. Depending on the sensitivity of the load 106, if the time period 122 is wider than a threshold, the load 106 may undergo an undesirable reset due to the lack of power. One way to address the issue is to make the capacitance $C_L$ large enough so that the stored charge in in the capacitor $C_L$ can provide power during the time period 122. However, a bigger capacitor will take excessive space on a chip depending on the value of $R_L$.

The control circuits 102, 104 consume current which needs to be minimized for power efficiency. Generally, is the main power source and the battery needs to be conserved by turning off circuits that are not necessary for the operations. For example, the $V_{BUS}$ control circuit 102 which may include charge pump and regulator needs to be turned off when the load 106 being provided power from. However, when goes away, $V_{BUS}$ and associated circuits need to be turned on fast to avoid any brown-out on the internal power rail (VDD-INT). The $V_{BUS}$ control circuit 102 is usually high power, therefore, keeping the $V_{BUS}$ control circuit 102 "ON" all the time to stay on duty is not desirable. In general, seamless transition from $V_{BUS}$ to $V_{BAT}$ is to implement because the control circuit 104 is low current and can stay on even when the $V_{BUS}$ control circuit 102 is on.

The embodiments described herein provide circuits and methods for fast and seamless transition from $V_{BAT}$ to $V_{BUS}$. The embodiments described herein use an on-duty low power $V_{BUS}$ control circuit that enables $V_{BUS}$ as "power source" when goes away. The embodiments described herein reduce the size of the required filtering capacitor which is needed for gate of a source follower regulator.

Referring back to FIG. 1A again. The circuit 100 shows a power system with two power sources, Power Source1=$V_{BAT}$ and Power Source2=$V_{BUS}$. is battery source and has a range of −3 to 5V and (assuming 3V for an easier discussion). $V_{BUS}$>4V is considered as $V_{BUS}$ functional voltage. $V_{BUS}$ can be as high as 20V in a real application, therefore the transistor $T_{VBUS}$ needs to be a high voltage device. The mentioned numbers are examples, a person skilled in the art would know that the actual numbers may be different depends on the system and architecture and circuits.

Figure 1B:
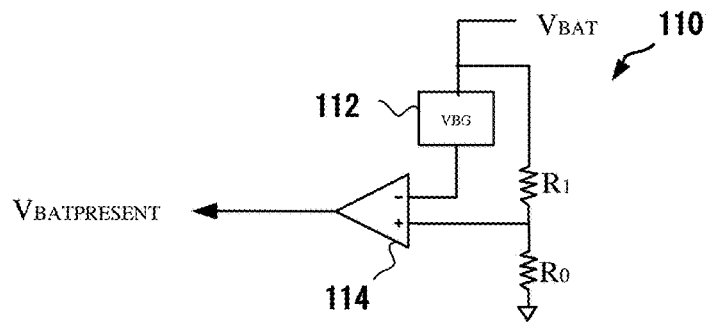
FIG. 1B depicts a detection circuit.

FIG. 1B shows a detection circuit 110. The circuit 110 includes a bandgap voltage source 112, a comparator 114 and a resistor divider including resistors $R_0$, $R_1$. The bandgap voltage source 112 provides a constant reference voltage that is compared with through the resistor divider. If the through the resistor divider is higher than the bandgap voltage, a $V_{BAT\text{-}PRESENT}$ signal is generated.

Due to the values, $T_{VBAT}$ transistor is a switch and $T_{VBUS}$ transistor needs to be a high voltage device which acts as a rough regulator. The source voltage is roughly $V_{THRESHOLD}$ ($V_{TH}$) lower than the gate voltage. Considering $V_{THRESHOLD}$=1V, to have $V_{DD\text{-}INT}$=3V, the gate voltage of $T_{VBUS}$ needs to be 4V. In some examples, even if the $V_{BUS}$ control circuit 102 is kept on all the time, making the gate voltage of $T_{VBUS}$ from 0v to 4V to switch the transistor may not happen without at least some time lag due to the larger gate to source parasitic capacitance in the transistor $T_{VBUS}$. The $V_{BUS}$ control circuit 102 consumes a few micro hundreds of current in general which is too much for stand-by condition. Getting the charge pump (in the $V_{BUS}$ control circuit 102) enabled may take a few 10s of microseconds to a few 100s of microseconds. During this startup phase, the voltage on $C_L$ will go down and $V_{DD\text{-}INT}$ may go below the required threshold which can cause an unwanted power on reset (POR) condition. Making $C_L$ large helps to hold charge on $V_{DD\text{-}INT}$, but larger capacitor means more area on the silicon which is expensive and needs to be avoided.

FIG. 2A shows a simple implementation on the $V_{BUS}$ side of the power switching circuit 140. The circuit 140 includes a regulator 142 using diodes $D_1$ . . . $D_N$. FIG. 2B shows a similar circuit that uses threshold based diodes implemented using transistors. In the circuit 140, Vreg=n*$V_D$. Considering $V_D$ equals approximately to 0.8V to get Vreg=4V, n=4/0.8=5. Hence, five diodes $D_1 \ldots D_N$ in series will be needed. The DC current can be calculated using I=($V_{BUS}$−4)/R. The current can be limited by choosing a larger resistor R. $C_{EX}$ is being used to store the required charge for the gate of the transistor $T_{VBUS}$ to turn on the transistor $T_{VBUS}$. The capacitor $C_{EX}$ needs to provide the required charge for the gate of the transistor $T_{VBUS}$ to prevent any glitch during the power source switching. The value of the capacitor $C_{EX}$ can be calculated based on the saved charge on $C_{EX}$ to have a fast ON time for the transistor $T_{VBUS}$. When the transistor $T_{VBUS}$ is off, the gate voltage is 0V (the switch S 144 is opened and the switch SB 146 is closed). To turn the transistor $T_{VBUS}$ on, the switch S 144 is closed and the switch SB 146 is opened.

A charge storage capacity (Q) of a capacitor is a multiplication of the capacitance and the voltage across the capacitor, that is Q=C×V. When S="0" and SB="1", the gate voltage of $T_{VBUS\ is}$ is 0V, assuming $V_{DD\text{-}INT}$=3V, Cgs is charged with voltage of 0 to 3V. To turn the transistor $T_{VBUS}$ ON, assuming $V_{th}$~1V, the voltage across Cgs~1V is needed. The capacitor $C_{EX}$ should provide the needed charge for Cgs when S="0" goes to S="1" (SB="1" goes to SB="0") to turn on the transistor $T_{VBUS}$.

At $t=0^-$: $Q_{Cex}=Cex*4, Q_{Cgs}=Cgs*(-3V)$

At $t=0^+$: $Q_{Cex}=Cex*4, Q_{Cgs}=Cgs*(+1V)$ $\Delta Q_{Cgs}(t=0 \rightarrow t=0^+)=Cgs(1+3)V=Cgs*4V$ $Q_{Cex}$ must be much higher than $\Delta Q_{Cgs}$ to deliver it the required charge. In some examples, Cex may be 10 times larger than Cgs. Due to a larger size of the transistor $T_{VBUS}$, the parasitic capacitance Cgs is also going to be larger, hence a larger $C_{EX}$ is needed to provide the required charge for Cgs to avoid any power on reset (POR) condition.

FIG. 3 shows an improved circuit 160 for a fast turn on of the transistor $T_{VBUS}$ without a need for a larger $C_{EX}$. The circuit 160 is configured to short the gate and the source of the transistor $T_{VBUS}$ when the transistor $T_{VBUS}$ is off. Further, the second terminal of the capacitor $C_{EX}$ is shorted to ground. The switch 162 and the switch 164 are operated by the signal SB and the transistor 166 and the transistor 168 are operated by the signal S. To turn the transistor $T_{VBUS}$ on, S=0 and SB=1. In one example, the signal S and SB can be produced by the control circuit 104. When $V_{BUS\text{-}PRESENT}$ is "1" (and $V_{BAT\text{-}PRESENT}$ is "0"), S=1, SB=0 and when $V_{BUS\text{-}PRESENT}$=0 is off, S=0, SB=1.

The smaller $C_{EX}$ provides a significant space saving on the silicon compare to the conventional solution.

In some examples, the switch 166 may be coupled with Vx. Vx can be connected to source of the transistor TA/Bus or ground. When Vx is connected to the source of $T_{VBUS}$, S=1. To turn $T_{VBUS}$ "ON", S=0 and SB=1. The charge calculation can be done as follow:

$Q_{Cex}(0-)+Q_{Cgs}(0-)=Q_{Cex}(0+)+Q_{Cgs}(0+)$ $Cex(4V)+Cgs(0V)=(Cex+Cgs)(1V) \rightarrow Cex=1/3 Cgs$.

When Vx is connected to ground:

$Q_{Cex}(0-)+Q_{Cgs}(0-)=Q_{Cex}(0+)+Q_{Cgs}(0+)$ $Cex(4V)+Cgs(-3V)=(Cex+Cgs)(1V) \rightarrow Cex=4/3 Cgs$.

Evidently, the embodiments described herein provides a significant area saving due to a smaller capacitor $C_{EX}$ compared to the traditional solutions.

Figure 4:
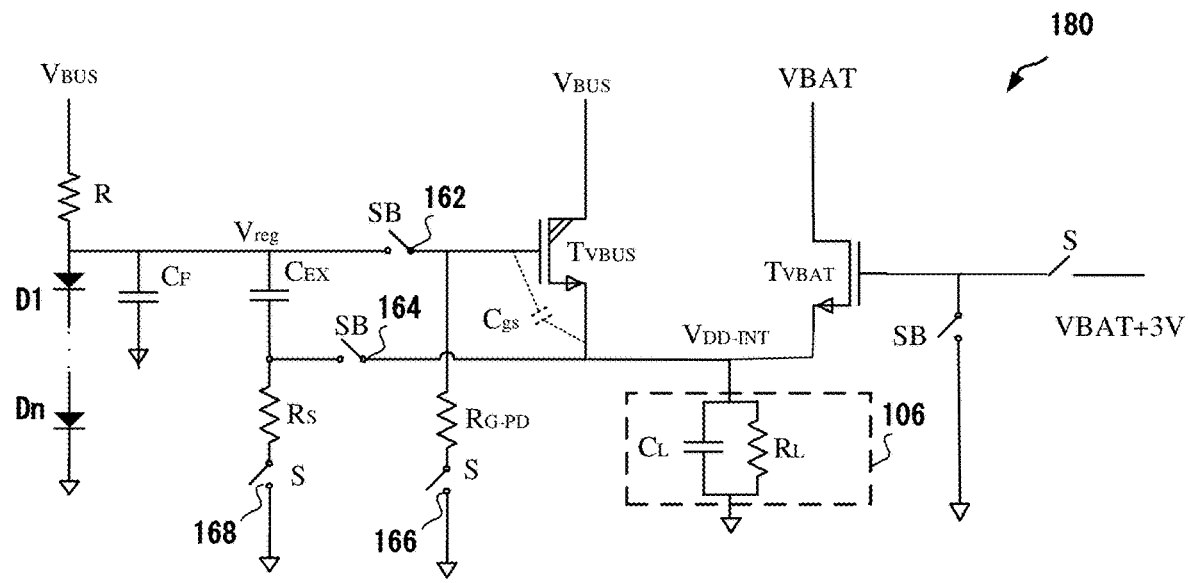
FIG. 4 a schematic of a circuit for switching between the power sources in accordance with one or more embodiments of the present disclosure.

FIG. 4 shows the power source switch circuit 180 in another embodiment. The capacitor CF is a small cap compared to $C_{EX}$ or Cgs to filter out supply noise. The resistor $R_S$ is a small resistor in series with $C_{EX}$ to prevent any sharp jump on voltage and provides a small and insignificant delay, but removes any possible high-frequency glitch on $V_{DD\text{-}INT}$. The resistor $R_{G\text{-}PD}$ is a resistor to ground the gate of the transistor $T_{VBUS}$ when the transistor $T_{VBUS}$ is off, to avoid any floating condition.

It should be noted that the above embodiments have been described using the regulator 142. If the PVT (process, voltage, temperature) variation of the rough regulator 142 can be tolerated, no charge pump based supporting circuitry is needed. In some examples, instead of the simple regulator 142, a charge pump based regulator may be used. A charge pump is a kind of DC to DC converter that uses capacitors for energetic charge storage to raise or lower voltage. Charge pumps use some form of switching device to control the connection of a supply voltage across a load through a capacitor. When the charge pump voltage is ready, the charge pump voltage is applied to the gate of the transistor $T_{VBUS}$. The charge pump output has less variation compare to the regulator 142, so the charge pump output can be applied for more reliable $V_{DD\text{-}INT}$.

Figure 5:
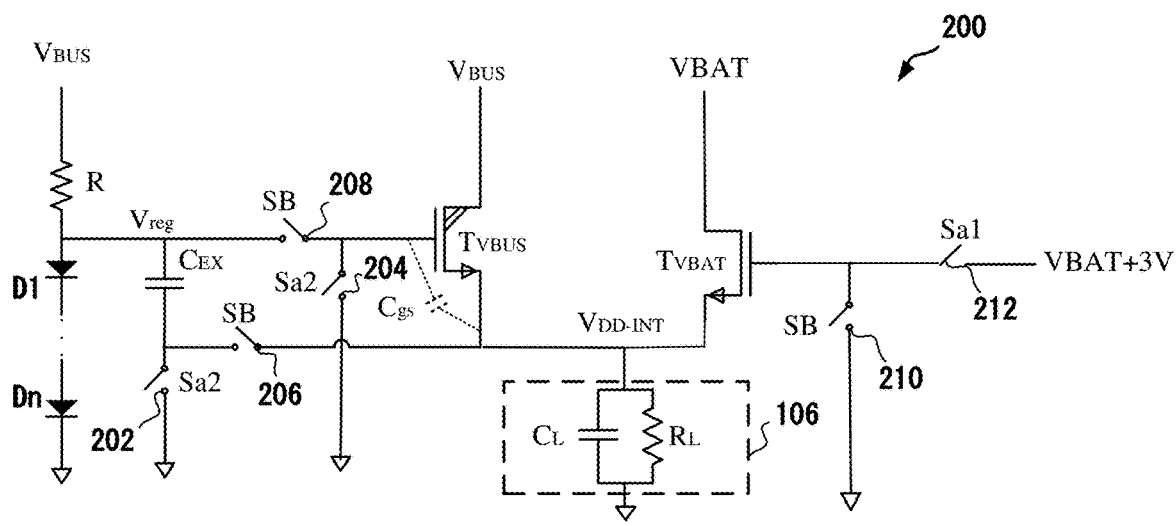
FIG. 5 a schematic of a circuit for switching between the power sources in accordance with one or more embodiments of the present disclosure.
Figure 6:
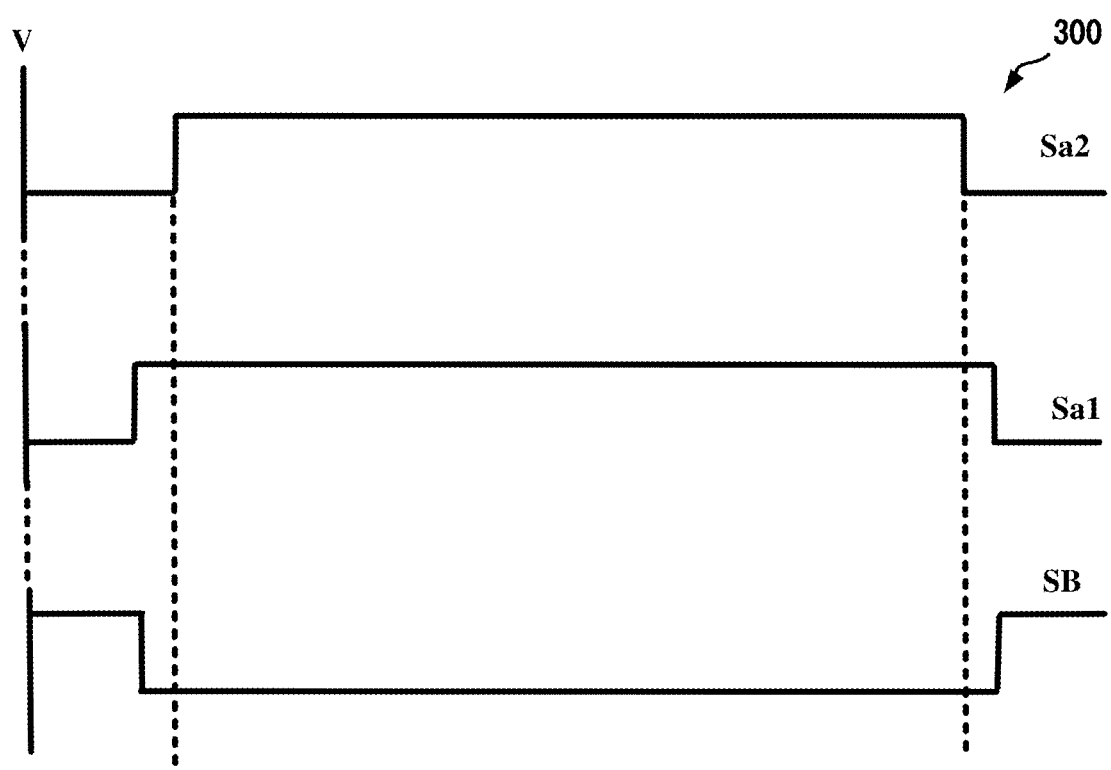
FIG. 6 shows a switching pulse diagram for the circuit of FIG. 5.

FIG. 5 shows the power source switch circuit 200 in another embodiment. The circuit 200 includes the switch 208, 210 operated by the signal SB, a switch 212 operated by the signal Sa1 and switches 202, 204 operated by the signal Sa2. To switch to the $V_{BUS}$ power source, Sa1=0, SB=1 and Sa2=0. The circuit 200 is configured to do break before make for switches 212, 202, 204. As shown in FIG. 6, the witching signal Sa2 has narrow pulse widths compared to the signal Sa1. The pulse widths of the signals Sa1, Sa2 and SB may be tuned to make seamless supply switching.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A power source switching circuit including a voltage regulator, a first transistor and a second transistor, wherein the first transistor is coupled with a first voltage source and the second transistor is coupled with a second voltage source, wherein the voltage regulator includes a resistor, one or more diodes coupled together in series and a capacitor, wherein terminals of the capacitor are coupled between a gate and a source of the first transistor through a first switch and a second switch respectively, wherein the capacitor is configured to hold charge to switch the first transistor on, wherein a value of the capacitor is smaller than a gate to source capacitance of the first transistor.

2. The circuit of claim 1, wherein the capacitor is coupled with a ground through a first resistor and a third switch.

3. The circuit of claim 2, wherein the gate of the first transistor is coupled with the ground through a second resistor and a fourth switch.

4. The circuit of claim 3, wherein the third switch and the fourth switch are configured to be operated by a switching pulse.

5. The circuit of claim 4, wherein the first switch and the second switch are configured to be operated by an inverse of the switching pulse.

6. The circuit of claim 5, wherein the first switch and the second switch are configured to be closed upon a detection of an availability of the first power source and an unavailability of the second power source.

7. The circuit of claim 6, wherein the third switch and the fourth switch are closed upon a detection of an availability of the second power source and an unavailability of the first power source.

8. There circuit of claim 1, wherein the a number of the one of more diodes depends on the voltage needed to turn on the first transistor.

9. The circuit of claim 1, further including a filter capacitor coupled to the one of more diodes in parallel to filter noise on an output of the voltage regulator.

10. The circuit of claim 9, wherein the filter capacitor is smaller in value than parasitic capacitor of the first transistor.

11. The circuit of claim 1, further wherein the first switch is coupled between the gate of the first transistor and an output of the voltage regulator.

12. The circuit of claim 1, further including a third switch coupled between the capacitor and ground.

13. The circuit of claim 3, further including a fifth switch coupled with a gate of the second transistor.

14. The circuit of claim 13, wherein the third switch and the fourth switch are configured to be operated by a first switching pulse and the fifth switch is configured to be operated by a second switching pulse, wherein the first switch pulse has a narrower pulse width than the second switching pulse.

15. The circuit of claim 1, wherein the value of the capacitor is configured to keep a voltage drop at an input of a load within a predefined threshold during a transition from the first voltage source to the second voltage source.

* * * * *